US012639105B2

(12) United States Patent
Sharma et al.

(10) Patent No.: US 12,639,105 B2
(45) Date of Patent: May 26, 2026

(54) VIRTUAL MACHINE (VM) MIGRATION WITH SMART NETWORK INTERFACE CARDS (NICS)

(71) Applicant: VMware LLC, Palo Alto, CA (US)

(72) Inventors: Ankur Kumar Sharma, Mountain View, CA (US); Madan Mohan Mulpuri, Sunnyvale, CA (US); Bharath Griddaluru, San Jose, CA (US); Neeraj Tandon, Santa Clara, CA (US)

(73) Assignee: VMware LLC, Palo Alto, CA (US)

( * ) Notice: Subject to any disclaimer, the term of this patent is extended or adjusted under 35 U.S.C. 154(b) by 457 days.

(21) Appl. No.: 18/122,804

(22) Filed: Mar. 17, 2023

(65) Prior Publication Data

US 2024/0311168 A1     Sep. 19, 2024

(51) Int. Cl.
| | |
|---|---|
| *G06F 9/48* | (2006.01) |
| *G06F 9/455* | (2018.01) |
| *H04L 41/0897* | (2022.01) |

(52) U.S. Cl.
CPC ........ *G06F 9/4856* (2013.01); *G06F 9/45558* (2013.01); *H04L 41/0897* (2022.05);
(Continued)

(58) Field of Classification Search
CPC ......... G06F 9/45558; G06F 2009/4557; G06F 2009/45595; G06F 9/4856; H04L 41/0897
See application file for complete search history.

(56) References Cited

U.S. PATENT DOCUMENTS

| | | | |
|---|---|---|---|
| 6,219,699 | B1 | 4/2001 | McCloghrie et al. |
| 7,079,544 | B2 | 7/2006 | Wakayama et al. |
(Continued)

FOREIGN PATENT DOCUMENTS

| | | |
|---|---|---|
| CN | 102124456 A | 7/2011 |
| CN | 103650433 A | 3/2014 |
(Continued)

OTHER PUBLICATIONS

Daniel Firestone, et al., 2018. Azure accelerated networking: SmartNICs in the public cloud. In USENIX Symposium on Networked Systems Design and Implementation (NSDI'18), 51-66 (Year: 2018).*
(Continued)

*Primary Examiner* — Jacob D Dascomb
(74) *Attorney, Agent, or Firm* — Kim & Stewart LLP

(57) ABSTRACT

Some embodiments provide a novel method of migrating a particular virtual machine (VM) from a first host computer to a second host computer. The first host computer of some embodiments has a physical network interface card (PNIC) that performs at least one of network forwarding operations and middlebox service operations for the particular VM. The first host computer sends, to the PNIC of the first host computer, a request for state information relating to at least one of network forwarding operations and middlebox service operations that the PNIC performs for the particular VM. The first host computer receives the state information from the PNIC. The first host computer provides the state information received from the PNIC to the second host computer as part of a data migration that is performed to migrate the particular VM from the first host computer to the second host computer.

20 Claims, 8 Drawing Sheets

(52) U.S. Cl.
CPC ................ *G06F 2009/4557* (2013.01); *G06F 2009/45595* (2013.01)

(56) References Cited

U.S. PATENT DOCUMENTS

| | | | |
|---|---|---|---|
| 7,260,716 B1 | 8/2007 | Srivastava |
| 7,502,884 B1 | 3/2009 | Shah et al. |
| 7,802,000 B1 | 9/2010 | Huang et al. |
| 8,054,832 B1 | 11/2011 | Shukla et al. |
| 8,149,734 B2 | 4/2012 | Lu |
| 8,479,275 B1 | 7/2013 | Naseh |
| 8,611,351 B2 | 12/2013 | Gooch et al. |
| 8,625,616 B2 | 1/2014 | Vobbilisetty et al. |
| 8,660,129 B1 | 2/2014 | Brendel et al. |
| 8,707,417 B1 | 4/2014 | Liang et al. |
| 8,799,900 B1 | 8/2014 | Kodorkin et al. |
| 9,195,491 B2 | 11/2015 | Zhang et al. |
| 9,215,210 B2 | 12/2015 | Raman et al. |
| 9,311,122 B2 | 4/2016 | Guay et al. |
| 9,330,161 B2 | 5/2016 | D'Amato et al. |
| 9,432,215 B2 | 8/2016 | Stabile et al. |
| 9,602,312 B2 | 3/2017 | Koponen et al. |
| 9,672,054 B1 | 6/2017 | Gupta et al. |
| 9,672,060 B2 | 6/2017 | Behere et al. |
| 9,772,866 B1 | 9/2017 | Aron et al. |
| 9,825,851 B2 | 11/2017 | Agarwal et al. |
| 9,923,811 B2 | 3/2018 | Agarwal et al. |
| 9,977,688 B2 | 5/2018 | Nipane et al. |
| 10,091,028 B2 | 10/2018 | Koponen et al. |
| 10,243,848 B2 | 3/2019 | Agarwal et al. |
| 10,257,049 B2 | 4/2019 | Fried et al. |
| 10,339,123 B2 | 7/2019 | Venkatesh et al. |
| 10,673,752 B2 | 6/2020 | Agarwal et al. |
| 10,880,158 B2 | 12/2020 | Lambeth et al. |
| 11,153,170 B1 | 10/2021 | Chandrashekhar et al. |
| 2002/0029270 A1 | 3/2002 | Szczepanek |
| 2002/0093952 A1 | 7/2002 | Gonda |
| 2002/0131414 A1 | 9/2002 | Hadzic |
| 2003/0167333 A1 | 9/2003 | Kumar et al. |
| 2003/0185151 A1 | 10/2003 | Kurosawa et al. |
| 2003/0185152 A1 | 10/2003 | Nederveen et al. |
| 2003/0188114 A1 | 10/2003 | Lubbers et al. |
| 2003/0188218 A1 | 10/2003 | Lubbers et al. |
| 2004/0042454 A1 | 3/2004 | Zabihi et al. |
| 2004/0052257 A1 | 3/2004 | Abdo et al. |
| 2005/0081212 A1 | 4/2005 | Goud et al. |
| 2005/0083953 A1 | 4/2005 | May |
| 2005/0182853 A1 | 8/2005 | Lewites et al. |
| 2005/0288040 A1 | 12/2005 | Charpentier et al. |
| 2006/0002370 A1 | 1/2006 | Rabie et al. |
| 2006/0069594 A1 | 3/2006 | Yamasaki |
| 2006/0092976 A1 | 5/2006 | Lakshman et al. |
| 2006/0179243 A1 | 8/2006 | Fields et al. |
| 2006/0179245 A1 | 8/2006 | Fields et al. |
| 2006/0193300 A1 | 8/2006 | Rawat et al. |
| 2006/0221720 A1 | 10/2006 | Reuter |
| 2006/0251120 A1 | 11/2006 | Arimilli et al. |
| 2006/0291447 A1 | 12/2006 | Siliquini et al. |
| 2007/0061492 A1 | 3/2007 | Riel |
| 2007/0217419 A1 | 9/2007 | Vasseur |
| 2007/0239987 A1 | 10/2007 | Hoole et al. |
| 2008/0013474 A1 | 1/2008 | Nagarajan et al. |
| 2008/0049646 A1 | 2/2008 | Lu |
| 2008/0104302 A1 | 5/2008 | Carpio |
| 2008/0133729 A1 | 6/2008 | Fridman et al. |
| 2008/0151863 A1 | 6/2008 | Lawrence et al. |
| 2008/0163207 A1 | 7/2008 | Reumann et al. |
| 2008/0225853 A1 | 9/2008 | Melman et al. |
| 2008/0268847 A1 | 10/2008 | Mukherjee et al. |
| 2008/0298274 A1 | 12/2008 | Takashige et al. |
| 2008/0301379 A1 | 12/2008 | Pong |
| 2009/0070337 A1 | 3/2009 | Romem et al. |
| 2009/0150521 A1 | 6/2009 | Tripathi |
| 2009/0150527 A1 | 6/2009 | Tripathi et al. |
| 2009/0193297 A1 | 7/2009 | Williams et al. |

| | | | |
|---|---|---|---|
| 2009/0241192 A1 | 9/2009 | Thomas |
| 2009/0279536 A1 | 11/2009 | Unbehagen et al. |
| 2009/0279545 A1 | 11/2009 | Moonen |
| 2009/0292858 A1 | 11/2009 | Lambeth et al. |
| 2009/0296726 A1 | 12/2009 | Snively et al. |
| 2009/0303880 A1 | 12/2009 | Maltz et al. |
| 2010/0115080 A1 | 5/2010 | Kageyama |
| 2010/0153514 A1* | 6/2010 | Dabagh ............... G06F 13/4022 |
| | | | 709/213 |
| 2010/0153701 A1 | 6/2010 | Shenoy et al. |
| 2010/0165876 A1 | 7/2010 | Shukla et al. |
| 2010/0165877 A1 | 7/2010 | Shukla et al. |
| 2010/0232435 A1 | 9/2010 | Jabr et al. |
| 2010/0250744 A1 | 9/2010 | Hadad et al. |
| 2010/0250784 A1 | 9/2010 | Henry et al. |
| 2010/0257263 A1 | 10/2010 | Casado et al. |
| 2010/0275199 A1 | 10/2010 | Smith et al. |
| 2010/0284402 A1 | 11/2010 | Narayanan |
| 2010/0287548 A1 | 11/2010 | Zhou et al. |
| 2010/0322255 A1 | 12/2010 | Hao et al. |
| 2011/0032898 A1 | 2/2011 | Kazmi et al. |
| 2011/0047218 A1 | 2/2011 | Nojima et al. |
| 2011/0051714 A1 | 3/2011 | Somes |
| 2011/0085559 A1 | 4/2011 | Chung et al. |
| 2011/0085569 A1 | 4/2011 | Gnanasekaran et al. |
| 2011/0090905 A1 | 4/2011 | Mueller et al. |
| 2011/0103260 A1 | 5/2011 | Jeyatharan et al. |
| 2011/0119748 A1 | 5/2011 | Edwards et al. |
| 2011/0188509 A1 | 8/2011 | Kern et al. |
| 2011/0231602 A1 | 9/2011 | Woods et al. |
| 2011/0299413 A1 | 12/2011 | Chatwani et al. |
| 2012/0014386 A1 | 1/2012 | Xiong et al. |
| 2012/0093035 A1 | 4/2012 | Kidambi et al. |
| 2012/0120964 A1 | 5/2012 | Koponen et al. |
| 2012/0147898 A1 | 6/2012 | Koponen et al. |
| 2012/0163388 A1 | 6/2012 | Goel et al. |
| 2012/0226799 A1 | 9/2012 | Kapur et al. |
| 2012/0236734 A1 | 9/2012 | Sampath et al. |
| 2012/0257634 A1 | 10/2012 | Martillo et al. |
| 2012/0275328 A1 | 11/2012 | Iwata et al. |
| 2013/0019277 A1 | 1/2013 | Chang et al. |
| 2013/0024579 A1 | 1/2013 | Zhang et al. |
| 2013/0028142 A1 | 1/2013 | Beheshti-Zavareh et al. |
| 2013/0042242 A1 | 2/2013 | Kagan |
| 2013/0044636 A1 | 2/2013 | Koponen et al. |
| 2013/0044641 A1 | 2/2013 | Koponen et al. |
| 2013/0044752 A1 | 2/2013 | Koponen et al. |
| 2013/0044761 A1 | 2/2013 | Koponen et al. |
| 2013/0058250 A1 | 3/2013 | Casado et al. |
| 2013/0058335 A1 | 3/2013 | Koponen et al. |
| 2013/0058350 A1 | 3/2013 | Fulton |
| 2013/0058354 A1 | 3/2013 | Casado et al. |
| 2013/0058358 A1 | 3/2013 | Fulton et al. |
| 2013/0060819 A1 | 3/2013 | Lambeth et al. |
| 2013/0074065 A1 | 3/2013 | McNeeney et al. |
| 2013/0103817 A1 | 4/2013 | Koponen et al. |
| 2013/0144992 A1 | 6/2013 | Barabash et al. |
| 2013/0159637 A1 | 6/2013 | Forgette et al. |
| 2013/0212212 A1 | 8/2013 | Addepalli et al. |
| 2013/0215769 A1 | 8/2013 | Beheshti-Zavareh et al. |
| 2013/0227550 A1 | 8/2013 | Weinstein et al. |
| 2013/0254328 A1 | 9/2013 | Inoue et al. |
| 2013/0268799 A1 | 10/2013 | Mestery et al. |
| 2013/0287026 A1 | 10/2013 | Davie |
| 2013/0301425 A1 | 11/2013 | Udutha et al. |
| 2013/0301501 A1 | 11/2013 | Olvera-Hernandez et al. |
| 2013/0308641 A1 | 11/2013 | Ackley |
| 2013/0347131 A1 | 12/2013 | Mooring et al. |
| 2014/0064104 A1 | 3/2014 | Nataraja et al. |
| 2014/0136908 A1 | 5/2014 | Maggiari et al. |
| 2014/0146817 A1 | 5/2014 | Zhang |
| 2014/0211661 A1 | 7/2014 | Gorkemli et al. |
| 2014/0241356 A1 | 8/2014 | Zhang et al. |
| 2014/0250220 A1 | 9/2014 | Kapadia et al. |
| 2014/0301391 A1 | 10/2014 | Krishnan et al. |
| 2014/0310796 A1 | 10/2014 | Lee et al. |
| 2014/0325037 A1 | 10/2014 | Elisha |
| 2015/0016276 A1 | 1/2015 | Decusatis et al. |
| 2015/0082417 A1 | 3/2015 | Bhagwat et al. |

(56) References Cited

U.S. PATENT DOCUMENTS

| | | | |
|---|---|---|---|
| 2015/0100704 | A1 | 4/2015 | Davie et al. |
| 2015/0103842 | A1 | 4/2015 | Chandrashekhar et al. |
| 2015/0103843 | A1 | 4/2015 | Chandrashekhar et al. |
| 2015/0106804 | A1 | 4/2015 | Chandrashekhar et al. |
| 2015/0106913 | A1 | 4/2015 | Wang et al. |
| 2015/0229641 | A1 | 8/2015 | Sun et al. |
| 2015/0281180 | A1 | 10/2015 | Raman et al. |
| 2016/0057014 | A1 | 2/2016 | Thakkar et al. |
| 2016/0134528 | A1 | 5/2016 | Lin et al. |
| 2016/0380815 | A1 | 12/2016 | Agarwal et al. |
| 2016/0380891 | A1 | 12/2016 | Agarwal et al. |
| 2016/0380925 | A1 | 12/2016 | Agarwal et al. |
| 2017/0116023 | A1* | 4/2017 | Zhang ................. H04L 41/0889 |
| 2017/0324645 | A1 | 11/2017 | Johnsen et al. |
| 2018/0062881 | A1 | 3/2018 | Chandrashekhar et al. |
| 2018/0157537 | A1 | 6/2018 | Chen et al. |
| 2019/0207847 | A1 | 7/2019 | Agarwal et al. |
| 2019/0303326 | A1 | 10/2019 | Desai et al. |
| 2019/0379731 | A1 | 12/2019 | Johnsen et al. |
| 2021/0200573 | A1* | 7/2021 | Cao ........................... G06F 9/48 |
| 2021/0314228 | A1 | 10/2021 | Chandrashekhar et al. |
| 2022/0121503 | A1 | 4/2022 | Bhide et al. |
| 2023/0024408 | A1* | 1/2023 | Singh ...................... H04L 45/04 |

FOREIGN PATENT DOCUMENTS

| | | | |
|---|---|---|---|
| CN | 103890751 | A | 6/2014 |
| EP | 1154601 | A1 | 11/2001 |
| EP | 1635506 | A1 | 3/2006 |
| EP | 1868318 | A1 | 12/2007 |
| EP | 3016331 | A1 | 5/2016 |
| EP | 3314831 | A1 | 5/2018 |
| WO | 2007115425 | A1 | 10/2007 |
| WO | 2010028364 | A1 | 3/2010 |
| WO | 2012113444 | A1 | 8/2012 |
| WO | 2013002766 | A1 | 1/2013 |
| WO | 2013152716 | A1 | 10/2013 |
| WO | 2015054671 | A2 | 4/2015 |
| WO | 2017003881 | A1 | 1/2017 |

OTHER PUBLICATIONS

Le et al. (Yanfang Le, Hyunseok Chang, Sarit Mukherjee, Limin Wang, Aditya Akella, Michael M Swift, and TV Lakshman. 2017. UNO:Unifying Host and Smart NIC Offload for Flexible Packet Processing. In Proceedings of the 2017 Symposium on Cloud Computing (SoCC'17) (Year: 2017).*

European Patent Office, Extended Search Report, Application No. 24162146.5, Jul. 15, 2024, 11 pages.

Author Unknown, "Apache Cassandra™ 1.2 Documentation," Jan. 13, 2013, 201 pages, DataStax.

Author Unknown, "OpenFlow Switch Specification, Version 1.1.0 Implemented (Wire Protocol 0x02)," Feb. 28, 2011, 56 pages, Open Networking Foundation.

Berde, Pankaj, et al., "ONOS Open Network Operating System An Open-Source Distributed SDN OS," Dec. 19, 2013, 34 pages.

Das, Saurav, et al., "Simple Unified Control for Packet and Circuit Networks," Month Unknown 2009, 2 pages, IEEE.

Das, Saurav, et al., "Unifying Packet and Circuit Switched Networks with OpenFlow," Dec. 7, 2009, 10 pages, available at http://OpenFlowSwitch.org/downloads/technicalreports/openflow-tr-2009-4-unification.pdf.

Hanna, Jeremy, "How ZooKeeper Handles Failure Scenarios," http://.apache.org/hadoop/Zookeeper/FailureScenarios. Dec. 9, 2010, 1 page.

Heller, Brandon, et al., "The Controller Placement Problem," Hot Topics in Software Defined Networks, Aug. 13, 2012, 6 pages, Helsinki, Finland.

Ioannidis, Sotiris, et al., "Implementing a Distributed Firewall," CCS '00, Month Unknown 2000, 10 pages, ACM, Athens, Greece.

Krishnaswamy, Umesh, et al., "ONOS Open Network Operating System—An Experimental Open-Source Distributed SDN OS," Apr. 16, 2013, 24 pages.

Lebresne, Sylvain, "[Release] Apache Cassandra 1.2 released," Jan. 2, 2013, 1 page.

Mahalingham, Mallik, et al., "VXLAN: A Framework for Overlaying Virtualized Layer 2 Networks over Layer 3 Networks," draft-mahalingham-dutt-dcops-vxlan-02.txt Internet Draft, Aug. 22, 2012, 20 pages, Internet Engineering Task Force.

Mahalingham, Mallik, et al., "VXLAN: A Framework for Overlaying Virtualized Layer 2 Networks over Layer 3 Networks," draft-mahalingham-dutt-dcops-vxlan-00.txt Internet Draft, Aug. 26, 2011, 20 pages, Internet Engineering Task Force.

Sherwood, Rob, et al., "FlowVisor: A Network Virtualization Layer," Oct. 14, 2009, 15 pages, Openflow—TR-2009-1.

* cited by examiner

VIRTUAL MACHINE (VM) MIGRATION WITH SMART NETWORK INTERFACE CARDS (NICS)

BACKGROUND

Smart network interface cards (NICs) are physical NICs with embedded arm cores. This allows the hypervisor of a host computer to offload networking and storage function-alities to the smart NIC in order to save central processing unit (CPU) of the hypervisor. When offloading software defined networking capabilities to a smart NIC, virtual machine (VM) migration needs to be addressed so that the networking state of a VM can be captured from the smart NIC, provided to the source host's hypervisor, and restored on the destination host's hypervisor, while keeping VM migration service level agreement (SLA) intact.

BRIEF SUMMARY

Some embodiments provide a novel method of migrating a particular virtual machine (VM) from a first host computer to a second host computer. The first host computer of some embodiments has a physical network interface card (PNIC) that performs at least one of network forwarding operations and middlebox service operations for the particular VM. The first host computer sends, to the PNIC of the first host computer, a request for state information relating to at least one of network forwarding operations and middlebox ser-vice operations that the PNIC performs for the particular VM. The first host computer receives the state information from the PNIC. The first host computer provides the state information received from the PNIC to the second host computer as part of a data migration that is performed to migrate the particular VM from the first host computer to the second host computer.

In some embodiments, the PNIC is a smart NIC (also referred to as a smartNIC or sNIC) that includes a central processing unit (CPU), one or more application-specific integrated circuits (ASICs), and one or more field-program-mable gate arrays (FPGAs). These ASICs (or FPGAs) can be designed for packet processing as well as other uses. In some embodiments, the network forwarding operations performed by the PNIC for the particular VM include layer 2 (L2) forwarding operations and/or layer 3 (L3) forwarding opera-tions. L2 and L3 forwarding operations use packet header values of data message flows in order to determine where and how to forward the data messages of the flow. In some embodiments, L2 and L3 forwarding operations include operations that are performed logical forwarding elements implemented by the PNIC, which can be based on L2 and L3 network addresses. The middlebox service operations per-formed by the PNIC for the particular VM can include various middlebox services, such as a firewall, distributed firewall, load balancing, network address translation (NAT), intrusion detection service (IDS), intrusion prevention ser-vice (IPS), etc.

The first host computer of some embodiments sends a first request to the PNIC requesting state information relating to the network forwarding operations, and a second request to the PNIC requesting state information relating to the middle-box service operations. Each of these requests are originated from a VM migration module operating on the first host computer, in some embodiments. The VM migration module sends the first request to a host forwarding module of the first host computer, which provides the first request to the PNIC. In some embodiments, the host forwarding module includes a virtual switch executing on the same host com-puter as the VM migration module. In other embodiments, the host forwarding module includes this virtual switch and/or one or more other modules (e.g., overlay, Internet Protocol (IP) discovery, etc.) executing on the same host computer as the VM migration module. The VM migration module sends the second request through a host service module (e.g., a hypervisor service engine, a host service VM (SVM), etc.) of the first host computer to reach the PNIC.

In some embodiments, before sending the requests for state information, the first host computer directs the PNIC to disable service hardware offload. In such embodiments, disabling service hardware offload causes the PNIC to only perform services on the software components of the PNIC instead of the hardware components. These services can be any middlebox services, such as firewall, distributed fire-wall, load balancing, NAT, IDS, IPS, etc. In some embodi-ments, if migration of a VM fails, the first host computer directs the PNIC to enable service hardware offload so the PNIC can continue performing middlebox service opera-tions for the VM on the service components of the PNIC.

The first host computer in some embodiments also popu-lates state information relating to a configuration of the particular VM, and provides this configuration state infor-mation along with the state information received from the PNIC to the second host computer. The particular VM's configuration is known by both the first host computer and the PNIC, so the first host computer does not need to request this information from the PNIC in order to provide it to the second host computer.

In some embodiments, the first host computer provides the state information to a VM migration module executing on the second host computer. This VM migration module receives the state information and uses it to instantiate the particular VM on the second host computer. The state information can be provided to this VM migration module by another VM migration module executing on the first host computer.

The PNIC of some embodiments is a first PNIC, and a second PNIC connected to the second host computer per-forms at least one of network forwarding operations and middlebox service operations for a set of VMs on the second host computer. In such embodiments, after the particular VM has been migrated to the second host computer, the second PNIC performs network forwarding operations and/or middlebox service operations for the particular VM. The first PNIC may then delete the state information for the particular VM, as it does not perform operations for the particular VM after the migration is complete.

In some embodiments, the particular VM is a first VM, and the first host computer also receives from a third host computer state information for a second VM in order to migrate the second VM from the third host computer to the first host computer. The first host computer uses this state information to instantiate the second VM on the first host computer, and provides the state information for the second VM to the first PNIC in order for the first PNIC to perform network forwarding operations and/or middlebox service operations for the second VM. The state information for the second VM may include state information relating to net-work forwarding operations and middlebox service opera-tions maintained by a third PNIC connected to the third host computer, and state information relating to the configuration of the second VM may be maintained by the third host computer.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method of migrating a particular virtual machine (VM) from a first host computer to a second host computer. The first host computer of some embodiments has a physical network interface card (PNIC) that performs at least one of network forwarding operations and middlebox service operations for the particular VM. The first host computer sends, to the PNIC of the first host computer, a request for state information relating to at least one of network forwarding operations and middlebox service operations that the PNIC performs for the particular VM. The first host computer receives the state information from the PNIC. The first host computer provides the state information received from the PNIC to the second host computer as part of a data migration that is performed to migrate the particular VM from the first host computer to the second host computer.

In some embodiments, the PNIC is a smart NIC. The network forwarding operations performed by the smart NIC for the particular VM may include layer 2 (L2) forwarding operations and/or layer 3 (L3) forwarding operations. L2 and L3 forwarding operations use packet header values of data message flows in order to determine where and how to forward the data messages of the flow. In some embodiments, L2 and L3 forwarding operations include operations that are performed logical forwarding elements implemented by the smart NIC, which can be based on L2 and L3 network addresses.

The middlebox service operations performed by the smart NIC for the particular VM can include various middlebox services, such as a firewall, distributed firewall, load balancing, network address translation (NAT), intrusion detection service (IDS), intrusion prevention service (IPS), etc. When offloading software defined networking capabilities to a smart NIC, VM migration needs to be addressed so that the networking state of a VM can be captured from the smart NIC, provided to the source host's hypervisor, and restored on the destination host's hypervisor, while keeping VM migration service level agreement (SLA) intact.

The smart NIC, in some embodiments, is a configurable network interface controller that includes a general-purpose central processing unit (CPU) (typically low-power compared to the processor of the computer for which the smart NIC acts as the network interface) in addition to one or more application-specific circuits (e.g., data message processing circuits).

Figure 1:
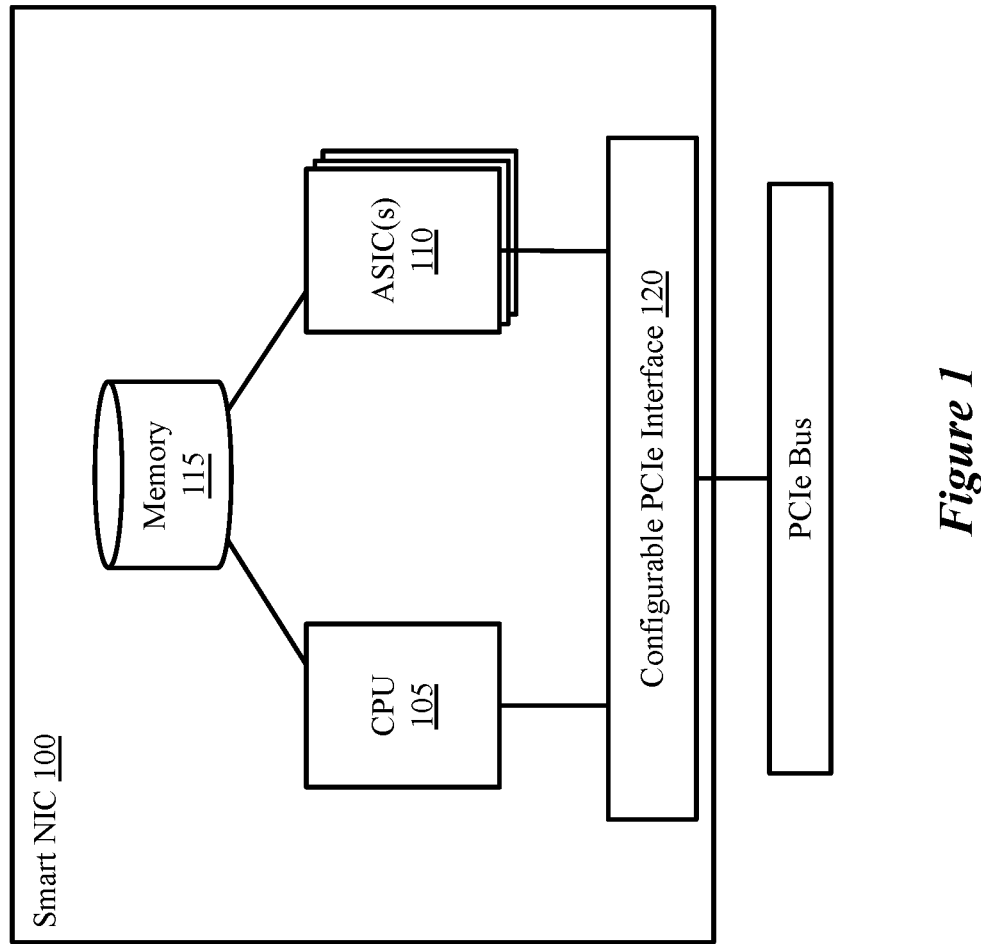
FIG. 1 illustrates the hardware of a smart NIC of some embodiments that can be configured to perform network forwarding and middlebox service offload for a host computer.

FIG. 1 illustrates the hardware of a smart NIC 100 of some embodiments that can be configured to perform network forwarding and middlebox service offload for a host computer. As shown, the smart NIC 100 includes its own general-purpose (x86) CPU 105, a set of application-specific integrated circuit (ASICs) 110, a memory 115, and a configurable Peripheral Component Interconnect Express (PCIe) interface 120. The ASICs 110, in some embodiments, include at least one I/O ASIC that handle the processing of data messages forwarded to and from the computer, and are at least partly controlled by the CPU 105. In some embodiments, either in addition to or as an alternative to the ASICs, the smart NIC may include a set of configurable field-programmable gate arrays (FPGAs).

The configurable PCIe interface 120 enables connection of the smart NIC 100 to the other physical components of a computer system (e.g., the x86 CPU, memory, etc.) via the PCIe bus of the computer system. Via this configurable PCIe interface, the smart NIC 100 can present itself to the computer system as a multitude of devices, including a data message processing NIC, a hard disk (using non-volatile memory express (NVMe) over PCIe), or other types of devices. The CPU 105 executes a NIC operating system (OS) in some embodiments that controls the ASICs 110 and can perform other operations as well. In some embodiments, a network forwarding and middlebox service offload ASIC 110 performs the operations to offload the network forwarding and middlebox service from a host computer.

Figure 2:
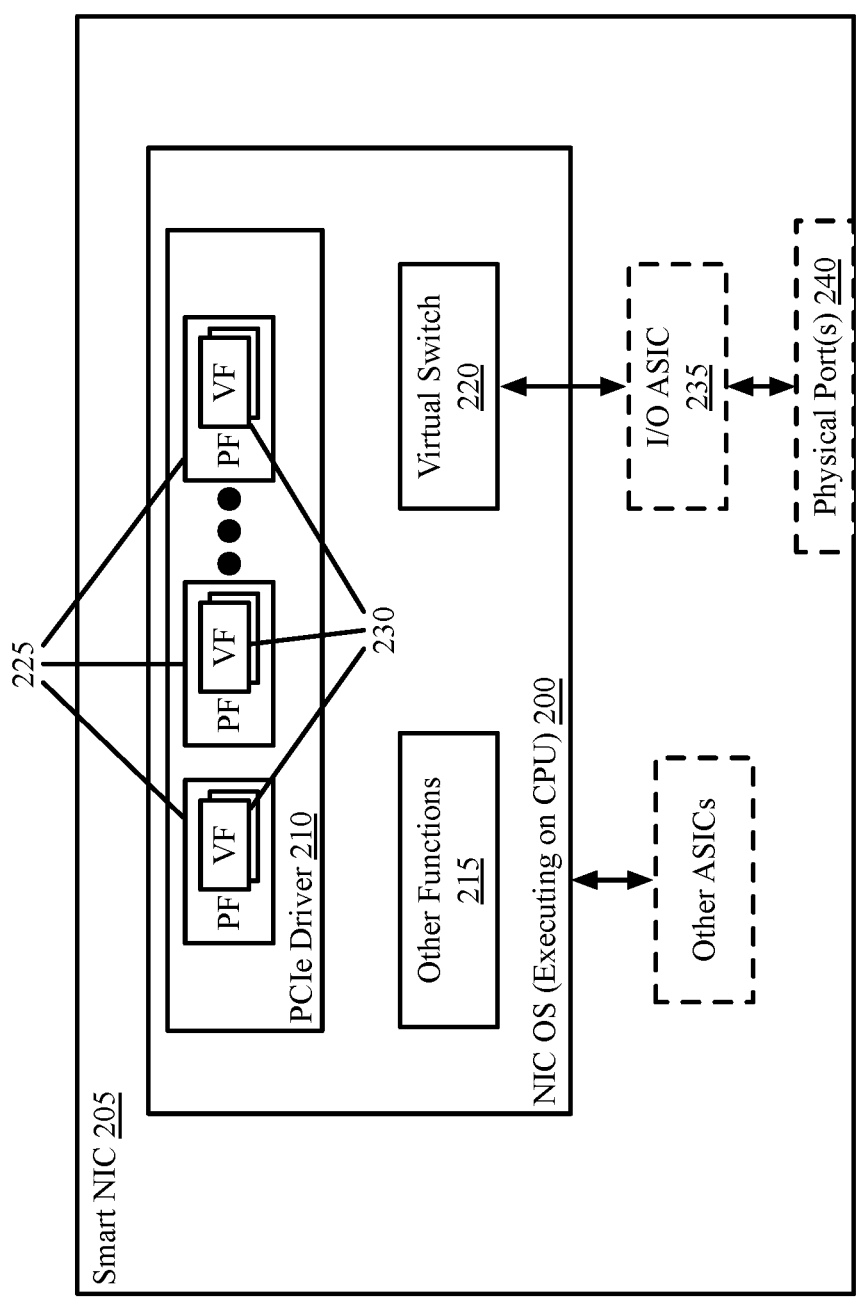
FIG. 2 illustrates the NIC OS of a smart NIC of some embodiments.

FIG. 2 conceptually illustrates the NIC OS 200 of a smart NIC 205 of some embodiments. The NIC OS 200 is executed, in some embodiments, by the CPU of the smart NIC (e.g., CPU 105). This NIC OS 200 includes a PCIe driver 210, a virtual switch 220, and other functions 215.

The PCIe driver 210 includes multiple physical functions 225, each of which is capable of instantiating multiple virtual functions 230. These different physical functions 225 enable the smart NIC to present as multiple different types of devices to the computer system to which it attaches via its PCIe bus. For instance, the smart NIC can present itself as a network adapter (for processing data messages to and from the computer system) as well as a non-volatile memory express (NVMe) disk in some embodiments.

The NIC OS 200 of some embodiments is capable of executing a virtualization program (similar to a hypervisor) that enables sharing resources (e.g., memory, CPU resources) of the smart NIC among multiple machines (e.g., VMs) if those VMs execute on the computer. The virtualization program can provide compute virtualization services and/or network virtualization services similar to a managed hypervisor in some embodiments. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

To implement these network virtualization services, the NIC OS 200 of some embodiments executes the virtual switch 220. The virtual switch 220 enables the smart NIC to perform software-defined networking and provide the I/O ASIC 235 of the smart NIC 205 with a set of flow entries (e.g., the cache entries described herein) so that the I/O ASIC 235 can perform flow processing offload (FPO) for the computer system in some embodiments. The I/O ASIC 235, in some embodiments, receives data messages from the network and transmits data messages to the network via one or more physical network ports 240.

The other functions 215 executed by the NIC operating system 200 of some embodiments can include various other operations, including operations not directly related to data message processing (e.g., operations for a machine-learning system). In addition, the NIC operating system 200 (either the virtual switch 220 or other functions 215 of the operating system) may perform various cache entry validation and invalidation operations and maintain a rule update table used to perform the cache entry validation.

As noted, the smart NIC of some embodiments processes data messages using cache entries (e.g., cache entries installed by a software forwarding element (SFE) executing on a computer for which the smart NIC is the interface) such that at least a subset of the data messages received at the smart NIC can be processed without a need to provide the data messages to the SFE. Data message processing by the smart NIC ASIC tends to be faster than processing by the SFE, even before accounting for the savings realized by avoiding the need to pass the data messages to and from the computer (e.g., via the PCIe interface).

Figure 3:
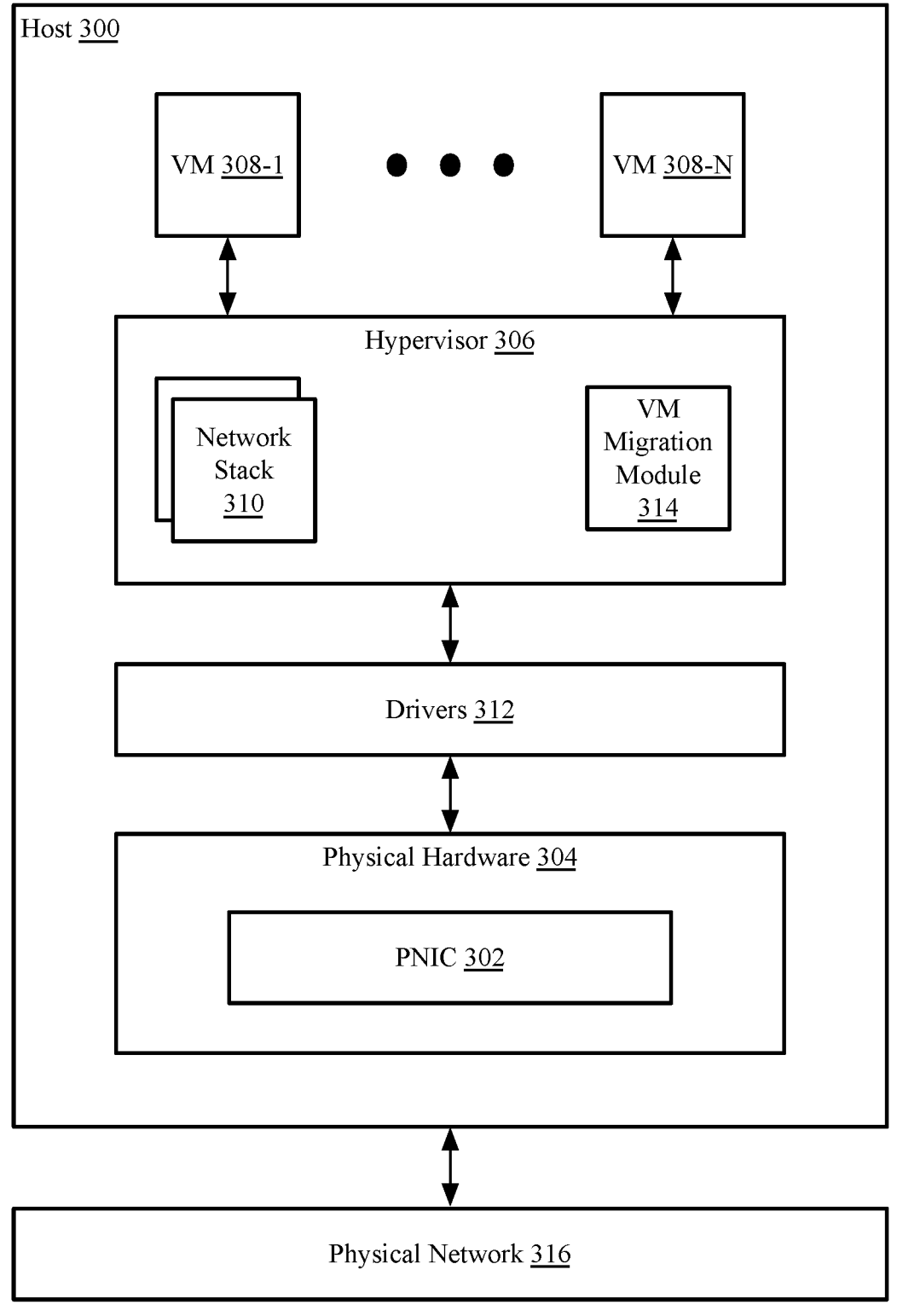
FIG. 3 illustrates an example host computer that offloads network forwarding operations and middlebox service operations to a PNIC executing as part of the physical hardware of the host computer.

FIG. 3 illustrates an example host computer 300 that offloads network forwarding operations and middlebox service operations to a PNIC 302 executing as part of the physical hardware 304 of the host computer 300. A host 300 of some embodiments is linked to other devices, such as other host computers, through a physical network 316. Host 300 may perform processing of network traffic (e.g., data messages).

Host 300 may include a hypervisor 306 and VMs 308-1 to 308-N. As used herein, the term hypervisor may refer generally to a software layer or component that supports the execution of multiple VMs including system-level software that supports name space containers. Host 300 provides resources to allow VMs 308 to send and receive data messages to and from the physical network 316. In some embodiments, the hypervisor 306 includes a network stack 310 for each VM 308 that processes data messages. The network stack 310 may perform operations on the data messages in software using the hypervisor 306. The operations that are performed may be defined by protocols, such as Transfer Control Protocol (TCP)/Internet Protocol (IP). The network stack 310 may include an input/output (I/O) chain that may perform network operations related to the delivery and reception of data messages as well as other operations.

Host 300 also includes physical hardware 304, which includes hardware devices for the host 300, such as CPUs, storage, etc. The physical hardware 304 also includes a PNIC 302, which is in some embodiments the physical interface for the host 300 to the physical network 316. For example, the PNIC 302 is an interface that is used to send data messages from VMs 308 to the physical network 316 and also to receive data messages from the physical network 316 that are destined to the VMs 308. In the receive scenario, the PNIC 302 includes queues (not shown) that store data messages that the PNIC 302 receives. Queues buffer the incoming data messages that are received from the physical network 308, but the queue may also perform other operations. Then, drivers 312 read the data messages corresponding to queues for further processing by the network stack 310.

Note that the above explanation, and other explanations herein, may reflect a common interpretation or abstraction of actual processing mechanisms. For instance, data messages may not actually be stored in queues, but instead descriptors or pointers to data messages (that are actually stored in host memory) may be stored in the queue. It is conventional to refer to these descriptors/pointers that identify a data message as the data messages themselves to abstract away complexity and explain higher level operations without burdening the reader with unnecessary technical details of well understood mechanisms. Such abstractions in the descriptions herein should not be construed as limiting in any way.

Figure 4:
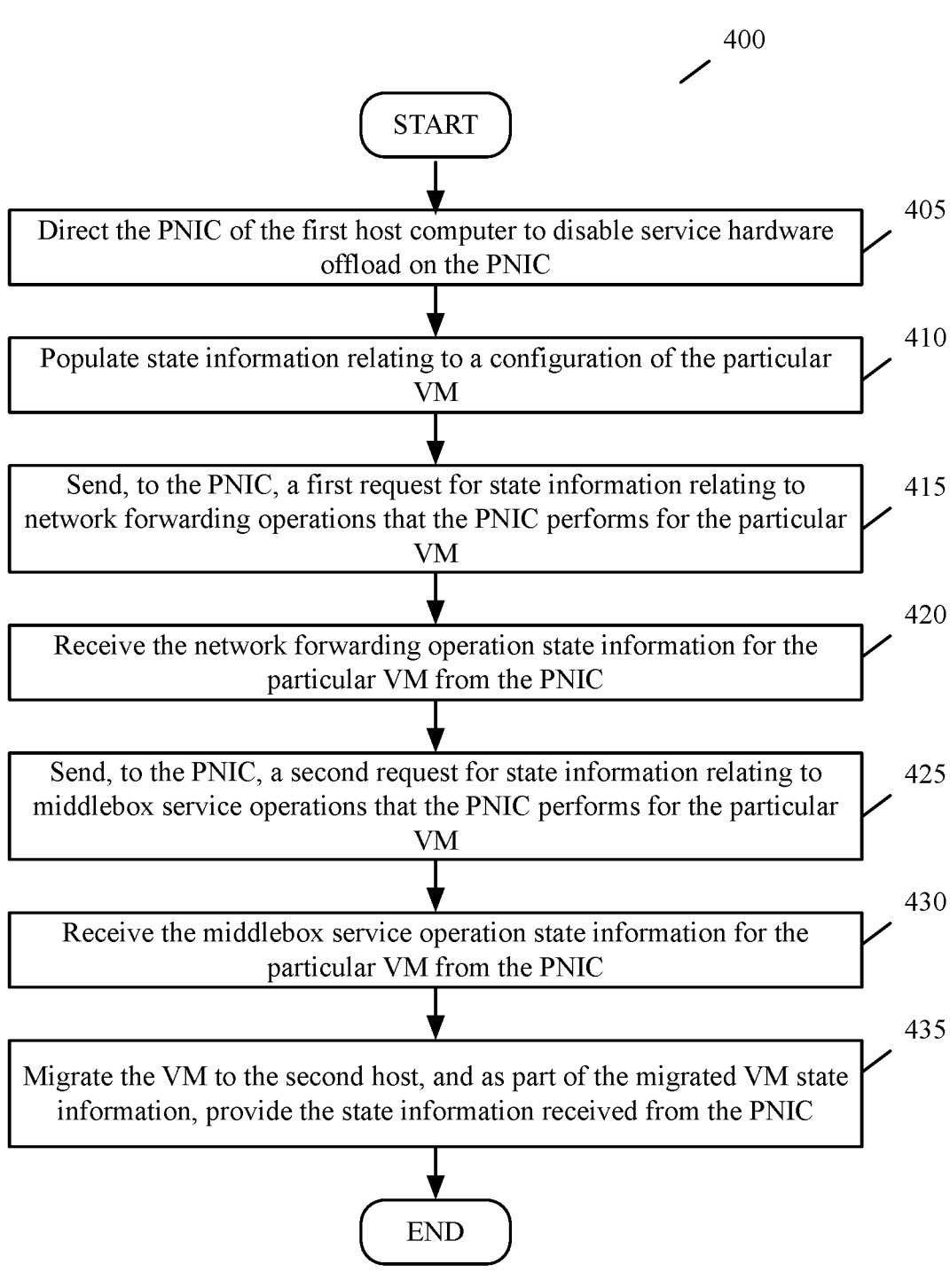
FIG. 4 conceptually illustrates a process of some embodiments of migrating a particular VM from a first host computer, that uses a PNIC to perform network forwarding and middlebox service operation offload, to a second host computer.

A VM migration module 314 may perform VM migration to migrate any of the VMs 308 on the host 300 to another host computer, or to instantiate a VM from another host computer onto the host 300. However, the VM migration module 314 may be implemented in other areas, such as in user space or in a VM 308. When network forwarding and/or middlebox service operations are offloaded from the hypervisor 306 to the PNIC 302, the VM migration module 314 of some embodiments requests the PNIC 302 for state information regarding VMs in the event of a VM migration. FIG. 4 conceptually illustrates a process 400 of some embodiments of migrating a particular VM from a first host computer to a second host computer, in which the first host computer has a PNIC that performs network forwarding operations and/or middlebox service operations for the particular VM. This process 400 may be performed by the first host computer, more specifically by a VM migration module executing on the first host computer.

The process 400 begins by directing (at 405) the PNIC of the first host computer to disable service hardware offload on the PNIC. In some embodiments, as soon as the VM migration has been initiated and before requesting any state information from the PNIC, the first host computer directs the PNIC to disable service hardware offload. Disabling service hardware offload causes the PNIC to only perform middlebox services for data messages associated with the particular VM on the software components of the PNIC instead of the hardware components of the PNIC. These services can be any middlebox services that can be offloaded to the PNIC, such as firewall, distributed firewall, load balancing, NAT, IDS, IPS, etc. In some embodiments, if migration of a VM fails, the first host computer directs the PNIC to enable service hardware offload so the PNIC can continue performing middlebox service operations for the VM on the service components of the PNIC.

Next, the process 400 populates (at 410) state information relating to a configuration of the particular VM. The particular VM's configuration is known by both the first host computer and the PNIC, so the first host computer does not need to request this state information from the PNIC in order to provide it to the second host computer for the migration. In some embodiments, the configuration state information is stored in a storage or a memory of the first host computer.

At 415, the process 400 sends, to the PNIC of the first host computer, a first request for state information relating to network forwarding operations that the PNIC performs for the particular VM. The network forwarding operation state information may include state information relating to at least one of L2 forwarding operations and L3 forwarding operations.

Because network forwarding operation state information changes as the PNIC processes and forwards data messages for the particular VM, the PNIC must provide this state information to the first host computer in order for the particular VM to be migrated. In some embodiments, the first request is sent by the first host computer's VM migration module to a host forwarding module of the first host computer, which provides the request to the PNIC. In some embodiments, the host forwarding module includes a virtual switch executing on the same host computer as the VM migration module. In other embodiments, the host forwarding module includes this virtual switch and/or one or more other modules (e.g., overlay, Internet Protocol (IP) discovery, etc.) executing on the same host computer as the VM migration module.

The first request in some embodiments is sent to the PNIC at a particular time before the migration of the particular VM is to occur. This particular time leaves enough time for the first request to be sent to the PNIC and for the PNIC to provide the requested information. After sending the first request, the process 400 receives (at 420) the network forwarding operation state information for the particular VM from the PNIC. The network forwarding operation state information is some embodiments is received at the host forwarding module which provides it to the VM migration module. In embodiments where the PNIC does not offload network forwarding operations for the first host computer, the first host computer populates the network forwarding operation state information itself, similarly to populating the configuration state information.

At 425, the process 400 sends, to the PNIC of the first host computer, a second request for state information relating to middlebox service operations that the PNIC performs for the particular VM. The middlebox service state information may include at least one of distributed firewall state information, load balancing state information, NAT state information, etc.

Similarly to the network forwarding operation state information, middlebox service operation state information changes as the PNIC processes and forwards data messages for the particular VM. So, the PNIC provides this state information upon request so that the particular VM can be migrated. In some embodiments, the second request is sent by the VM migration module to a host service module of the first host computer, which provides it to the PNIC. A host service module is in some embodiments a module of the first host computer that intercepts data messages to protect VMs from security attacks and unwanted traffic, such as a hypervisor service engine, a host service VM (SVM), etc.

The host service module in some embodiments connects the first host computer to the PNIC through a NIC driver to exchange messages with the PNIC. In some embodiments, the host service module connects to a port of an SFE of the host that connects to the PNIC's driver to send and receive messages to and from the PNIC. In some embodiments, the SFE is a software switch, while in other embodiments, it is a software router or a combined software switch/router. The SFE in some embodiments implements one or more logical forwarding elements (e.g., logical switches or logical routers) with SFEs executing on other hosts in a multi-host environment. A logical forwarding element in some embodiments can span multiple hosts to connect VMs that execute on different hosts but belong to one logical network.

Like the first request, in some embodiments, the second request is sent to the PNIC at a particular time before the migration of the particular VM is to occur. This particular time leaves enough time for the second request to be sent to the PNIC and for the PNIC to provide the requested information. Next, the process 400 receives (at 430) the middlebox service operation state information from the PNIC. The middlebox service operation state information can be received by the first host computer at the host service module, which provides it to the VM migration module. In embodiments where the PNIC does not offload middlebox service operations for the first host computer, the first host computer populates the middlebox service operation state information itself, similarly to populating the configuration state information.

Once the first host computer has all state information for the particular VM, the process 400 migrates (at 435) the particular VM to the second host computer, and as part of the migrated VM state information, provides the state information received from the PNIC. The first host computer in some embodiments provides the configuration state information it populated itself (e.g., configuration state information), and the network forwarding and middlebox service state information received from the PNIC. State information provided as part of a VM migration in some embodiments includes one or more of (1) VM state information stored by the VM, (2) hypervisor state information (e.g., hypervisor forwarding state information (L2 or L3 forwarding elements) and hypervisor service state information (e.g., distributed firewall, distributed load balancer, etc.)), (3) SVM state information (e.g., state information relating to service operations performed by an SVM for the VM), and (4) PNIC state information (network forwarding and/or middlebox service state information received from the PNIC).

In some embodiments, the first host computer provides the state information to a VM migration module executing on the second host computer. This VM migration module on the second host computer receives the state information and uses it to instantiate the particular VM on the second host computer. The PNIC of the first host computer in some embodiments is a first PNIC, and a second PNIC connected to the second host computer performs at least one of network forwarding operations and middlebox service operations for a set of VMs on the second host computer. In such embodiments, after the particular VM has been migrated to the second host computer, the second PNIC can perform network forwarding operations and/or middlebox service operations for the particular VM. The first PNIC may then delete the state information for the particular VM, as it does not perform operations for the particular VM after the migration is complete. Once the particular VM has been migrated to the second host computer, the process 400 ends.

Figure 5:
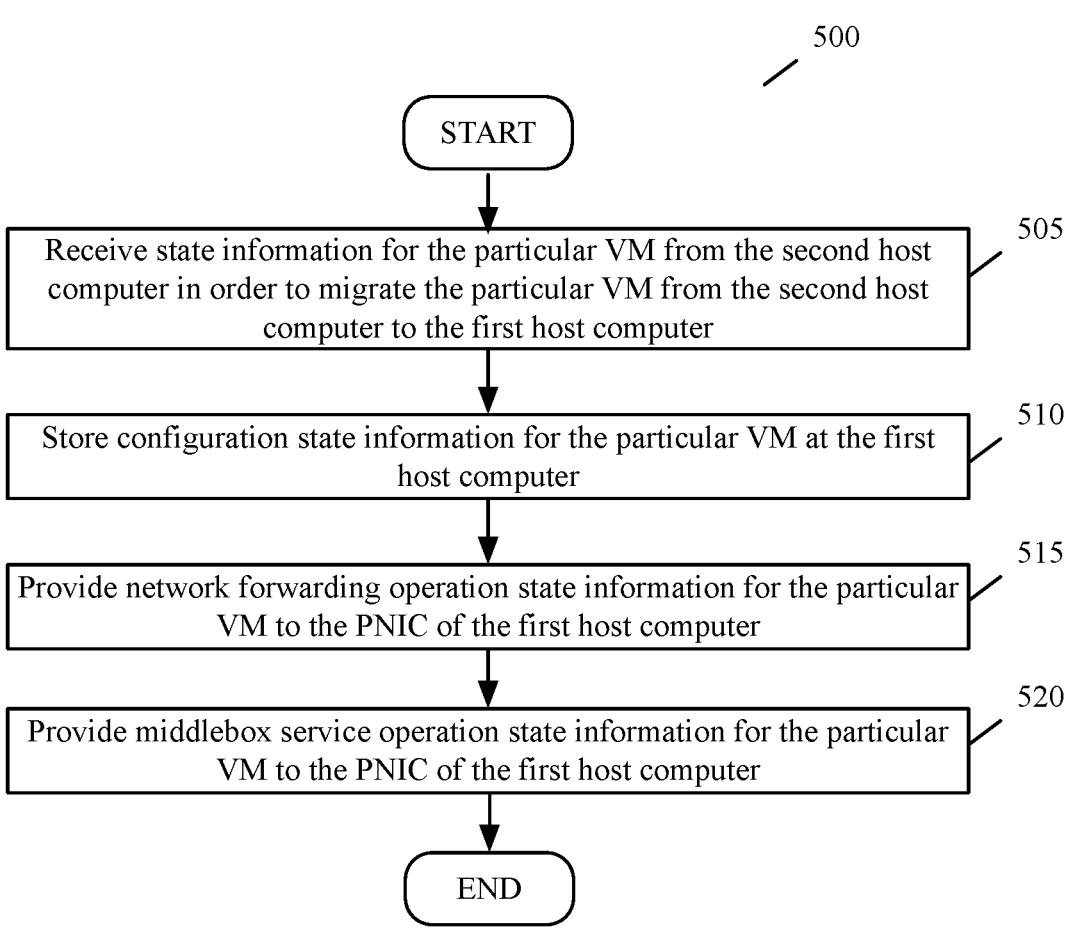
FIG. 5 conceptually illustrates a process of some embodiments for instantiating a particular VM on a first host computer that was migrated from a second host computer.

FIG. 5 conceptually illustrates a process 500 of some embodiments for instantiating a particular VM on a first host computer that was migrated from a second host computer. This process 500 may be performed by the first host computer, more specifically by the VM migration module of the first host computer. The process 500 begins by receiving (at 505) state information for the particular VM from the second host computer in order to migrate the particular VM from the second host computer to the first host computer. The received state information in some embodiments includes state information relating to the configuration of the particular VM, network forwarding operations performed for the VM, and middlebox service operations performed for the VM. In some embodiments, the configuration state information is populated by the second host computer, and the network forwarding operation state information and middlebox service operation state information is provided to the second host computer by a PNIC of the second host computer that maintains the state information. In such embodiments, this PNIC performs network forwarding and middlebox service offload for data messages associated with the particular VM.

Next, the process 500 stores (at 510) configuration state information for the particular VM at the first host computer. In some embodiments, this configuration state information is stored in a storage or a memory of the first host computer, and provides the necessary information for the first host computer to properly instantiate the particular VM. At 515, the process 500 provides network forwarding operation state information for the particular VM to the PNIC of the first host computer. In order for the PNIC to offload network forwarding operations for the first host computer, state information relating to these operations for the particular VM need to be provided to the PNIC. In some embodiments, the network forwarding operation state information is provided by the first host computer's VM migration module to the host forwarding module of the first host computer, which provides it to the PNIC. In embodiments where the PNIC does not offload network forwarding operations for the first host computer, the first host computer stores the network forwarding operation state information at the first host computer, similarly to storing the configuration state information.

At 520, the process 500 provides middlebox service operation state information for the particular VM to the PNIC of the first host computer. In order for the PNIC to offload middlebox service operations for the first host computer, state information relating to these operations for the particular VM need to be provided to the PNIC. In some embodiments, the middlebox service operation state information is provided by the first host computer's VM migration module to the host service module of the first host computer, which provides it to the PNIC. In embodiments where the PNIC does not offload middlebox service operations for the first host computer, the first host computer stores the middlebox service operation state information at the first host computer, similarly to storing the configuration state information. Once all state information for the particular VM has been distributed among the necessary components of the first host computer (i.e., the storage of the first host computer and/or the PNIC of the first host computer), the migration of the particular VM is complete and the process 500 ends.

Figure 6:
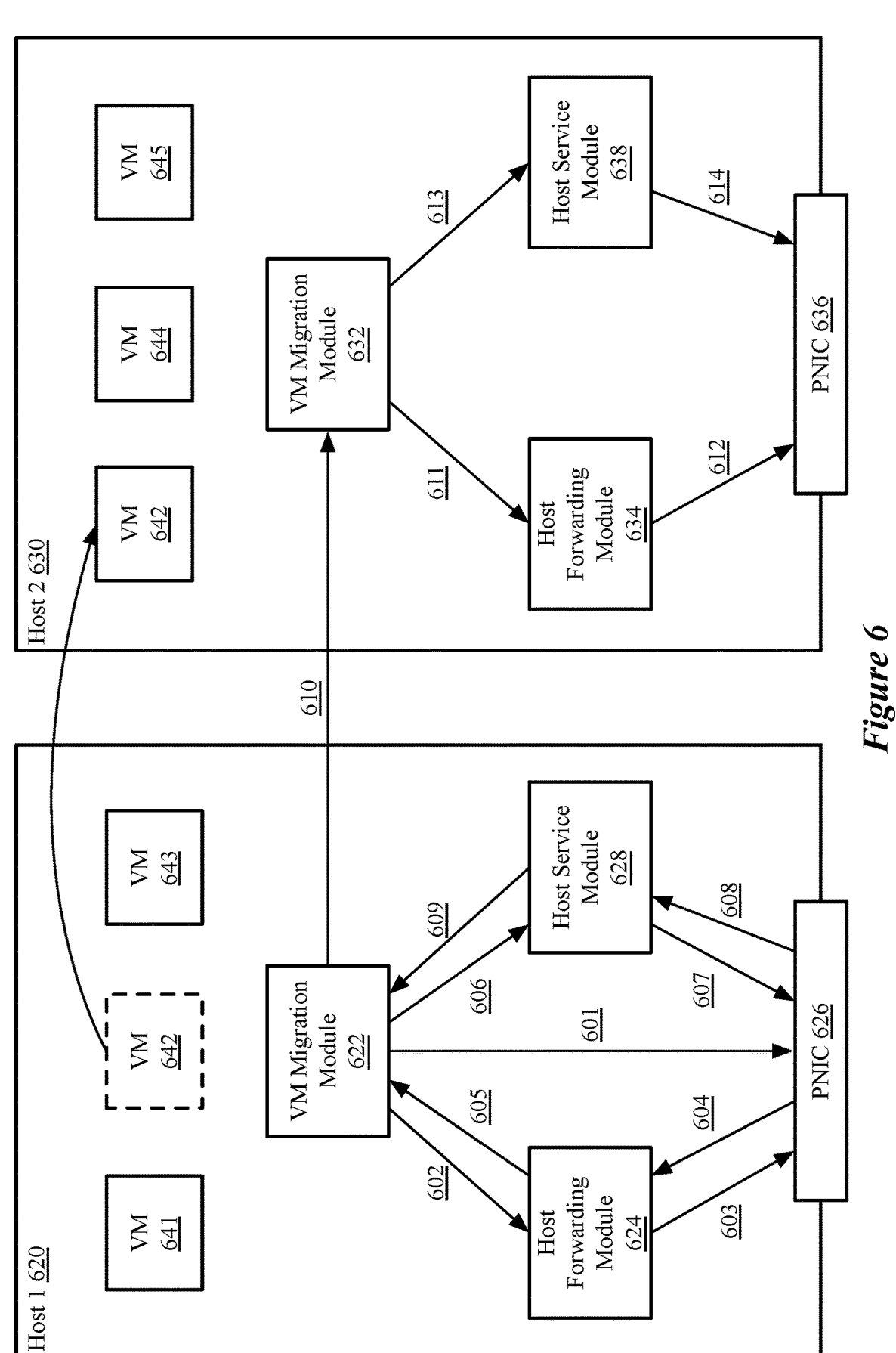
FIG. 6 illustrates the communication between components of a first host computer and a second host computer for performing VM migration.

FIG. 6 illustrates the communication between components of a first host computer 620 and a second host computer 630 for performing VM migration. In this example, the first host 620 initially includes a set of three VMs 641, 642, and 643, and the second host initially includes a set of two VMs 644 and 645. The VM 642 is being migrated from the first host 620 to the second host 630. As soon as VM migration of the VM 642 has been initiated, the VM migration module 622 of the first host 620 directs, at 601, the PNIC 626 to disable service hardware offload. When a VM is being migrated, the PNIC 626 should only perform middlebox services on the software components of the PNIC 626 instead of its hardware components. So, the VM migration module 622 disables hardware offload once migration of the VM 642 has been initiated.

Then, the VM migration module 622 sends a request at 602 for network forwarding operation state information for the VM 642 to the host forwarding module 624 (e.g., a virtual switch), which provides this request to the PNIC 626 at 603. At 604, the PNIC 626 provides the requested network forwarding operation state information for the VM 642 to the host forwarding module 624, and at 605, the host forwarding module 624 provides it to the VM migration module 622.

Next, the VM migration module 622 sends a request at 606 for middlebox service operation state information for the VM 642 to the host service module 628 (e.g., a hypervisor service engine, a host SVM, etc.), which provides this request to the PNIC 626 at 607. At 608, the PNIC 626 provides the requested middlebox service operation state information for the VM 642 to the host service module 628, and at 609, the host service module 628 provides it to the VM migration module 622. In some embodiments, the VM migration module 622 populates configuration state information for the VM 642 itself, which may be performed at any point during steps 601-609.

Once the VM migration module 622 has all of the necessary state information for the VM 642, at 610, the VM migration module 622 migrates the VM 642 to the second host 630, and, as part of the migration, provides the state information to the VM migration module 632 of the second host computer 630. In some embodiments, after providing the state information to the second host computer 630, the VM migration module 622 re-enables hardware service hardware offload for the PNIC 626.

The VM migration module 632 uses the received state information for the VM 642 to instantiate the VM on the second host computer 630. The configuration state information for the VM 642 is stored by the VM migration module 632. At 611, the VM migration module 632 sends the VM's network forwarding operation state information to the host forwarding module 634, so that it can be provided to the PNIC 636 at 612.

At 613, the VM migration module 632 sends the VM's middlebox service operation state information to the host service module 638, so that it can be provided to the PNIC 636 at 614. Once the PNIC 636 has the network forwarding operation and middlebox service operation state information for the VM 642, the PNIC 636 can perform network forwarding and middlebox service operations for the VM 642. Once the state information has been provided to the PNIC 636, the migration of the VM 642 is complete. After the migration, the first host 620 only includes VMs 641 and 643, while the second host 630 includes VMs 642, 644, and 645.

Figure 7:
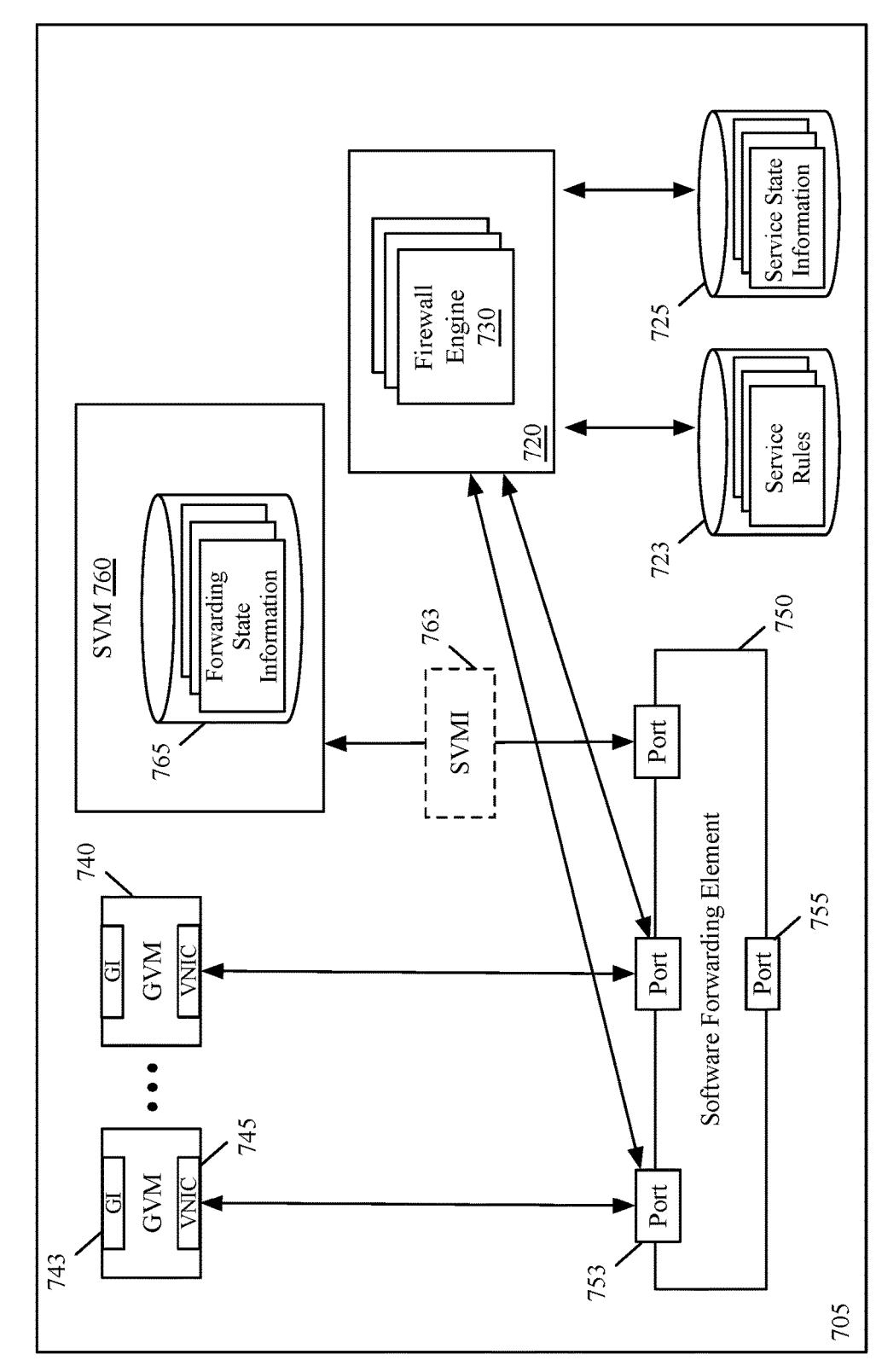
FIG. 7 illustrates a detailed example of a host computer that in some embodiments is used to establish a distributed architecture for offloading network forwarding operations and/or middlebox service operations to a PNIC of the host computer.

FIG. 7 illustrates a more-detailed example of a datacenter 700 including a host computer 705 that in some embodiments is used to establish a distributed architecture for offloading network forwarding operations and/or middlebox service operations to a PNIC (not shown). This host computer 705 includes service engines 720, a service rule storage 723, a service state information storage 725, guest VMs (GVMs) 740, and an SVM 760. The service engines 720 in this example include a firewall engine 730, but other embodiments may include any or more types of service engines (e.g., discovery, process control, encryption, load balancer, etc.).

In FIG. 7, the GVMs 740 execute on a hypervisor. Also, in FIG. 7, the host computer 705 includes an SFE 750. In some embodiments, the SFE 750, the service engines 720, the service rule storages 723, and the service state information storage 725 operate in the kernel space of the hypervisor, while the GVMs 740 and SVM 760 operate in the hypervisor's user space. In other embodiments, one or more service engines are user space modules (e.g., are SVMs).

In some embodiments, the GVMs 740 serve as data end points in the datacenter. Examples of such machines include webservers, application servers, database servers, etc. In some cases, all the GVMs belong to one entity, e.g., an enterprise that operates the host. In other cases, the host 705 operates in a multi-tenant environment (e.g., in a multi-tenant data center), and different GVMs 740 may belong to one tenant or to multiple tenants.

As shown, each GVM 740 also includes a virtual network interface card (VNIC) 745 in some embodiments. Each VNIC is responsible for exchanging messages between its GVM and the SFE 750. Each VNIC connects to a particular port 753 of the SFE 750. The SFE 750 also connects to a PNIC (not shown) of the host 705. In some embodiments, the VNICs are software abstractions created by the hypervisor of one or more PNICs of the host 705. Additionally, the GVMs 740 each may include a guest introspection (GI) agent 743 that perform GI operations for the GVMs 740.

In some embodiments, the SFE 750 maintains a single port 753 for each VNIC of each GVM 740 and for the SVM 760. The SFE 750 connects to the host PNIC (through a NIC driver (not shown)) to send outgoing messages and to receive incoming messages. In some embodiments, the SFE 750 is defined to include a port 755 that connects to the PNIC's driver to send and receive messages to and from the PNIC. The host PNIC of some embodiments also performs network forwarding and middlebox service operations for the host 705.

The SFE 750 performs message-processing operations to forward messages that it receives on one of its ports to another one of its ports. For example, in some embodiments, the SFE tries to use data in the message (e.g., data in the message header) to match a message to flow based rules, and upon finding a match, to perform the action specified by the matching rule (e.g., to hand the message to one of its ports 753 or 755, which directs the message to be supplied to a destination VM or to the PNIC).

In some embodiments, the SFE 750 is a software switch, while in other embodiments it is a software router or a combined software switch/router. The SFE 750 in some embodiments implements one or more logical forwarding elements (e.g., logical switches or logical routers) with SFEs executing on other hosts in a multi-host environment. A logical forwarding element in some embodiments can span multiple hosts to connect VMs that execute on different hosts but belong to one logical network.

Different logical forwarding elements can be defined to specify different logical networks for different users, and each logical forwarding element can be defined by multiple SFEs on multiple hosts. Each logical forwarding element isolates the traffic of the VMs of one logical network from the VMs of another logical network that is serviced by another logical forwarding element. A logical forwarding element can connect VMs executing on the same host and/or different hosts. In some embodiments, the SFE extracts from a data message a logical network identifier (e.g., a VNI) and a media access control (MAC) address. The SFE in these embodiments uses the extracted VNI to identify a logical port group, and then uses the MAC address to identify a port within the port group.

Software switches (e.g., software switches of hypervisors) are sometimes referred to as virtual switches because they operate in software and they provide the VMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. Virtual Extensible Local Area Network (VXLAN) provides one manner for creating such logical switches. The VXLAN standard is described in Mahalingam, Mallik; Dutt, Dinesh G.; et al. (2013 May 8), VXLAN: A Framework for Overlaying Virtualized Layer 2 Networks over Layer 3 Networks, IETF.

The ports 753 of the SFE 750 in some embodiments include one or more function calls to one or more modules that implement special input/output (I/O) operations on incoming and outgoing messages that are received at the ports. Examples of I/O operations that are implemented by the ports 753 include Address Resolution Protocol (ARP) broadcast suppression operations and Dynamic Host Configuration Protocol (DHCP) broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports can implement a chain of I/O operations on incoming and/or outgoing messages in some embodiments. Also, in some embodiments, other modules in the data path (such as the VNICs 745, ports 753, etc.) implement the I/O function call operations instead of, or in conjunction with, the ports 753. In some embodiments, the SFE 750 communicates with the SVM 760, like with the GVMs 740, using a port 753. In other embodiments, to communicate with the SVM 760, the SFE 750 uses the port 753 and an SVM interface (SVMI) 763.

In some embodiments, one or more of function calls of the SFE ports 753 can be to one or more service engines 720 that process service rules in the service rule storages 723. Each service engine 723 in some embodiments has its own service rule storage 723 and service state information storage 725. FIG. 7 presents just one service rule storage 723 and service state information storage 725 for all the service engines in order not to obscure the presentation in this figure with unnecessary detail. Also, in some embodiments, each GVM 740 has its own instance of each service engine 720 (e.g., its own firewall engine 730). In other embodiments, one service engine can service data message flows for multiple GVMs on a host (e.g., VMs for the same logical network).

The service engine 720 of some embodiments maintains middlebox service operation state information in the storage 725 to provide to another host computer in the event of migration of one or more of the GVMs 740. In such embodiments, the PNIC of the host 705 does not perform middlebox service operations for the host. The service engine 720 may retrieve state information regarding a particular GVM from the storage 725 to provide to the other host computer such that the other host computer will receive the service state information for the particular GVM. In other embodiments, when the PNIC performs middlebox service operations for the host 705, the PNIC maintains this state information and the service engine 720 retrieves it from the PNIC to provide to the other host computer.

The SVM 760 is in some embodiments a host forwarding module of the host 705 that maintains the network forwarding state information for the GVMs 740. In such embodiments, the PNIC of the host 705 does not perform network forwarding operations for the host. This forwarding operation state information may be provided to the SVM 760 along with configuration state information by the GI agents 743. The SVM 760 of some embodiments includes a forwarding state information storage 765 for storing state information for each GVM (e.g., configuration state information, forwarding operation state information, etc.) to provide to another host computer when one or more GVMs are migrated to the other host. The SVM 760 may retrieve state information regarding a particular GVM from the storage 765 to provide to the other host computer such that the other host computer on which the GVM is being migrated to will receive the forwarding state information for the particular GVM. In other embodiments, when the PNIC performs network forwarding operations for the host 705, the PNIC maintains this state information and the SVM 760 retrieves it from the PNIC to provide to the other host computer. The SVM 760 in these embodiments may still maintain configuration state information for the GVMs 740 in the storage 765.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
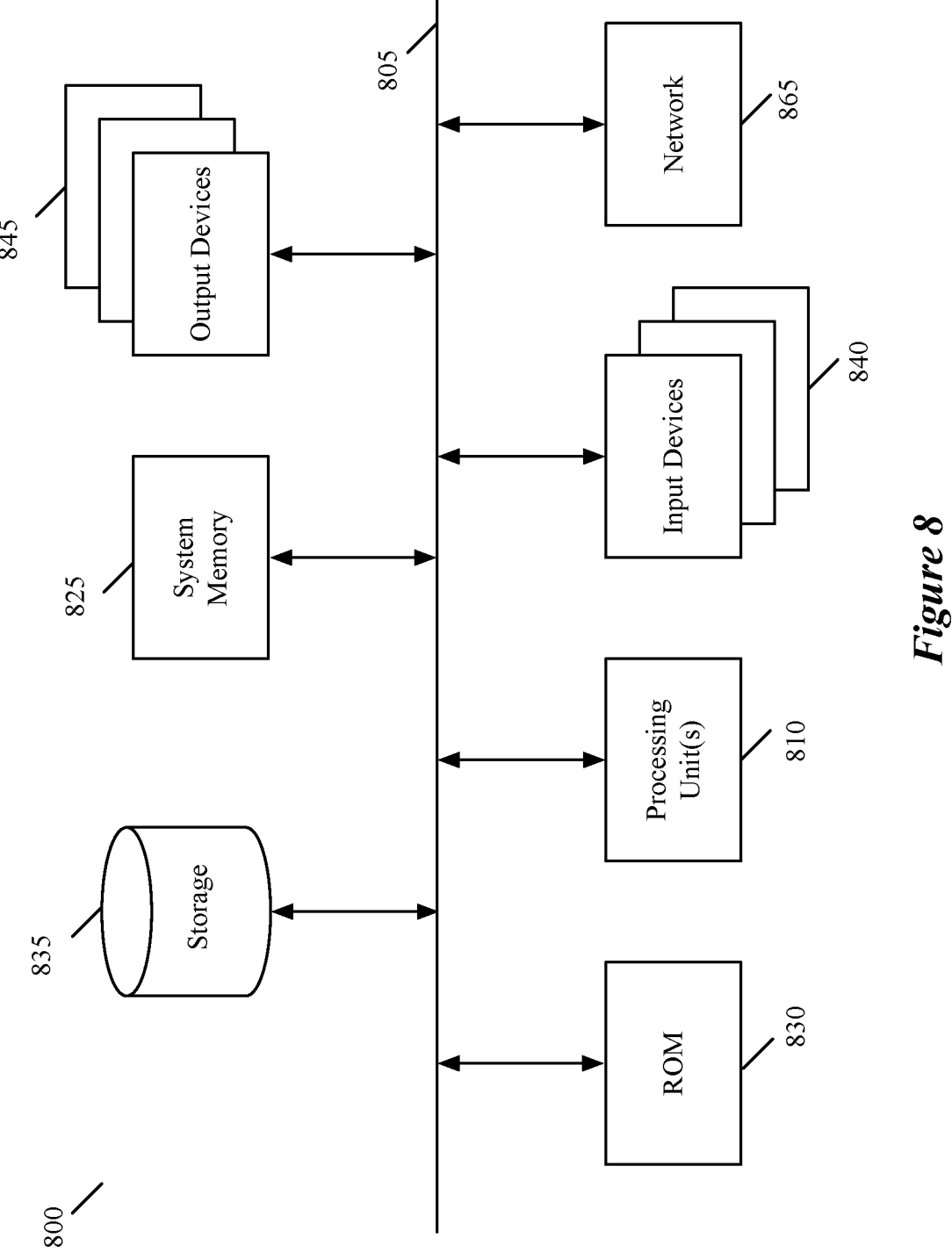
FIG. 8 conceptually illustrates an electronic system with which some embodiments of the invention are implemented.

FIG. 8 conceptually illustrates a computer system 800 with which some embodiments of the invention are implemented. The computer system 800 can be used to implement any of the above-described computers and servers. As such, it can be used to execute any of the above described processes. This computer system includes various types of non-transitory machine readable media and interfaces for various other types of machine readable media. Computer system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments. The read-only-memory (ROM) 830 stores static data and instructions that are needed by the processing unit(s) 810 and other modules of the computer system. The permanent storage device 835, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the computer system. The input devices 840 include alphanumeric keyboards and pointing devices (also called "cursor control devices"). The output devices 845 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples computer system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 4 and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method of migrating a first virtual machine (VM) from a first host computer to a second host computer, the first host computer having a first physical network interface card (PNIC) that includes (i) one or more software components configured to perform network forwarding operations and middlebox service operations for the first VM by executing on a processor of the first PNIC and (ii) one or more hardware accelerator devices separate from the processor of the first PNIC that are also configured to perform the network forwarding operations and the middlebox service operations for the first VM, the method comprising:

at the first host computer:
sending, to the first PNIC of the first host computer, one or more requests for (i) state information relating to the network forwarding operations that the one or more software components perform for the first VM and (ii) state information relating to the middlebox service operations that the one or more software components perform for the first VM;
receiving the network forwarding and middlebox service state information from the first PNIC; and
sending the network forwarding and middlebox service state information received from the first PNIC to the second host computer as part of a data migration that is performed to migrate the first VM from the first host computer to the second host computer.

2. The method of claim 1, wherein sending the one or more requests comprises sending a first request for the network forwarding state information and sending a second request for the middlebox service state information.

3. The method of claim 2, wherein:
the first request is sent by a VM migration module of the first host computer to a host forwarding module of the first host computer which forwards the first request to the first PNIC, the host forwarding module including a virtual switch of the first VM, and
the second request is sent by the VM migration module to a host service module of the first host computer which provides the second request to the first PNIC, the host service module being configured to intercept data messages of the first VM.

4. The method of claim 1, further comprising:
before sending the one or more requests, directing the first PNIC to disable service hardware offload to cause the one or more software components to begin performing the middlebox service operations for the first VM instead of the one or more hardware accelerator devices.

5. The method of claim 1, wherein the middlebox service state information comprises at least one of distributed firewall state information, load balancing state information, and network address translation (NAT) state information.

6. The method of claim 1, wherein the network forwarding operations for the first VM comprise at least one of layer 2 (L2) forwarding operations and layer 3 (L3) forwarding operations.

7. The method of claim 1, further comprising:
populating, on the first host computer, configuration state information relating to a configuration of the first VM; and
sending, to the second host computer, the configuration state information along with the network forwarding and middlebox service state information received from the first PNIC.

8. The method of claim 1, wherein the network forwarding and middlebox service state information received from the first PNIC is sent to a VM migration module executing on the second host computer, the VM migration module executing on the second host computer being configured to migrate the first VM from the first host computer to the second host computer.

9. The method of claim 8, wherein the network forwarding and middlebox service state information is sent to the VM migration module executing on the second host computer by a VM migration module executing on the first host computer, the VM migration modules executing on the first and second host computers being configured to migrate the first VM from the first host computer to the second host computer.

10. The method of claim 1, wherein the second host computer has a second PNIC configured to perform network forwarding operations and middlebox service operations for a set of VMs operating on the second host computer.

11. The method of claim 10, wherein after the first VM is migrated to the second host computer, the second PNIC performs the network forwarding operations and the middlebox service operations for the first VM.

12. The method of claim 11, wherein after the first VM is migrated to the second host computer, the first PNIC deletes the network forwarding and middlebox service state information for the first VM.

13. The method of claim 1, further comprising:
  receiving, by the first host computer from a third host computer, state information for a second VM that has been requested to be migrated from the third host computer to the first host computer; and
  providing, by the first host computer, the received state information for the second VM to the first PNIC, wherein the first PNIC then performs network forwarding operations and middlebox service operations for the second VM.

14. The method of claim 13, wherein the third host computer includes a second PNIC, and the third host computer received the state information for the second VM from the second PNIC.

15. A non-transitory machine readable medium storing a program that, when executed by at least one processing unit of a first host computer, causes the first host computer to perform a method of migrating a first virtual machine (VM) from the first host computer to a second host computer, the first host computer having a first physical network interface card (PNIC) that includes (i) one or more software components configured to perform network forwarding operations and middlebox service operations for the first VM by executing on a processor of the first PNIC and (ii) one or more hardware accelerator devices separate from the processor of the first PNIC that are also configured to perform the network forwarding operations and the middlebox service operations for the first VM, the program comprising sets of instructions for:
  at the first host computer:
    sending, to the first PNIC of the first host computer, one or more requests for (i) state information relating to the network forwarding operations that the one or more software components perform for the first VM and (ii) state information relating to the middlebox service operations that the one or more software components perform for the first VM;
  receiving the network forwarding and middlebox service state information from the first PNIC; and
  sending the network forwarding and middlebox service state information received from the first PNIC to the second host computer as part of a data migration that is performed to migrate the first VM from the first host computer to the second host computer.

16. The non-transitory machine readable medium of claim 15, wherein sending the one or more requests comprises sending a first request for the network forwarding state information and sending a second request for the middlebox service state information.

17. The non-transitory machine readable medium of claim 16, wherein:
  the first request is sent by a VM migration module of the first host computer to a host forwarding module of the first host computer which provides the first request to the first PNIC, the host forwarding module including a virtual switch of the first VM, and
  the second request is sent by the VM migration module to a host service module of the first host computer which provides the second request to the first PNIC, the host service module being configured to intercept data messages of the first VM.

18. The non-transitory machine readable medium of claim 15, wherein the method further comprises:
  before sending the one or more requests, directing the first PNIC to disable service hardware offload to cause the one or more software components to begin performing the middlebox service operations for the first VM instead of the one or more hardware accelerator devices.

19. The non-transitory machine readable medium of claim 15, wherein the middlebox service state information comprises at least one of distributed firewall state information, load balancing state information, and network address translation (NAT) state information.

20. The non-transitory machine readable medium of claim 15, wherein the network forwarding operations for the first VM comprise at least one of layer 2 (L2) forwarding operations and layer 3 (L3) forwarding operations.

* * * * *